(12) United States Patent
Shao

(10) Patent No.: US 9,553,318 B2
(45) Date of Patent: Jan. 24, 2017

(54) SURFACTANT REMOVAL FROM PALLADIUM NANOPARTICLES

(75) Inventor: Minhua Shao, Farmington, CT (US)

(73) Assignee: Audi AG, Ingolstadt (DE)

( * ) Notice: Subject to any disclaimer, the term of this patent is extended or adjusted under 35 U.S.C. 154(b) by 420 days.

(21) Appl. No.: 14/122,546

(22) PCT Filed: Jun. 8, 2011

(86) PCT No.: PCT/US2011/001030
§ 371 (c)(1),
(2), (4) Date: Nov. 26, 2013

(87) PCT Pub. No.: WO2012/169992
PCT Pub. Date: Dec. 13, 2012

(65) Prior Publication Data
US 2014/0096645 A1    Apr. 10, 2014

(51) Int. Cl.
*B22F 1/00* (2006.01)
*C23F 1/12* (2006.01)
*C25F 3/02* (2006.01)
*H01M 4/92* (2006.01)
*H01M 4/88* (2006.01)
*B82Y 30/00* (2011.01)

(52) U.S. Cl.
CPC ............. *H01M 4/92* (2013.01); *B22F 1/0018* (2013.01); *B22F 1/0088* (2013.01); *B82Y 30/00* (2013.01); *C23F 1/12* (2013.01); *C25F 3/02* (2013.01); *H01M 4/88* (2013.01); *B22F 2201/013* (2013.01); *B22F 2301/25* (2013.01); *B22F 2998/10* (2013.01); *B22F 2999/00* (2013.01); *Y02E 60/50* (2013.01)

(58) Field of Classification Search
None
See application file for complete search history.

(56) References Cited

U.S. PATENT DOCUMENTS

| 5,712,062 | A | * | 1/1998 | Yamana | ............... | C01B 31/005 |
| | | | | | | 106/2 |
| 7,879,153 | B1 | | 2/2011 | Seo et al. | | |
| 2002/0034675 | A1 | | 3/2002 | Starz et al. | | |

(Continued)

FOREIGN PATENT DOCUMENTS

| CN | 10111337 A | 1/2008 |
| CN | 101198407 A | 6/2008 |

(Continued)

OTHER PUBLICATIONS

The International Search Report mailed Jan. 2, 2012 for International Application No. PCT/US2011/001030.

(Continued)

*Primary Examiner* — George Wyszomierski
(74) *Attorney, Agent, or Firm* — Seed IP Law Group LLP

(57) ABSTRACT

A method for removing a surfactant from a palladium nanoparticle includes exposing the palladium nanoparticle to hydrogen and removing the surfactant from the palladium nanoparticle. A method includes synthesizing a palladium nanoparticle using a surfactant. The surfactant influences a geometric property of the palladium nanoparticle and bonds to the palladium nanoparticle. The method also includes exposing the palladium nanoparticle to hydrogen to remove the surfactant from the palladium nanoparticle.

22 Claims, 2 Drawing Sheets

(56) References Cited

U.S. PATENT DOCUMENTS

| | | | | |
|---|---|---|---|---|
| 2002/0194958 | A1* | 12/2002 | Lee | B22F 1/0022 75/370 |
| 2006/0134505 | A1 | 6/2006 | Wang et al. | |
| 2008/0096986 | A1 | 4/2008 | Thomazeau et al. | |
| 2010/0261028 | A1* | 10/2010 | Kondoh | B22F 1/02 428/539.5 |

FOREIGN PATENT DOCUMENTS

| | | |
|---|---|---|
| CN | 101690884 A | 4/2010 |
| EP | 2 177 257 A1 | 3/2016 |
| JP | 2000-351603 A | 12/2000 |
| JP | 2010-103512 A | 5/2010 |
| KR | 20100024169 A | 3/2010 |
| KR | 20100038069 A | 4/2010 |
| KR | 10-0959245 B1 | 5/2010 |

OTHER PUBLICATIONS

Extended European Search Report dated Dec. 9, 2015, for corresponding EP Application No. 11867235.1-1353/2718046, 7 pages.

* cited by examiner

SURFACTANT REMOVAL FROM PALLADIUM NANOPARTICLES

BACKGROUND

Palladium and palladium alloy nanoparticles can be used as catalysts, particularly in fuel cells used to produce electrical energy. For example, in a hydrogen fuel cell, a palladium catalyst can be used to oxidize hydrogen gas into protons and electrons at the anode of the fuel cell. At the cathode of the fuel cell, the palladium catalyst triggers the oxygen reduction reaction (ORR), leading to formation of water.

Fuel cell performance depends in part on the available surface area of the palladium nanoparticles. Fuel cell performance generally increases when the surface area of the palladium nanoparticles is increased. In addition to size, the shape of the palladium nanoparticles can also be selected in order to further increase the oxygen reduction reaction (ORR) activity. Surfactants are commonly used during nanoparticle formation to control the particle size and shape. The surfactants bind to the nanoparticles as they are shaped and sized.

Once the nanoparticles have been formed, the surfactants used for shaping and sizing the particles need to be removed. Some surfactants can be removed by washing and low temperature heat treatment. Other surfactants, however, require long washing times (as long as weeks in special solvents) or high temperature treatment at temperatures above 300° C. For some catalyst nanoparticles, high temperature treatment presents problems. For example, at 300° C., cubic palladium nanoparticles may lose their shape and increase in particle size. As a result, using high temperature treatment to remove surfactants from the nanoparticles removes benefits the surfactants were intended to provide.

SUMMARY

A method for removing a surfactant from a palladium nanoparticle includes exposing the palladium nanoparticle to hydrogen and removing the surfactant from the palladium nanoparticle.

A method includes synthesizing the palladium nanoparticle using a surfactant. The surfactant influences a geometric property of the palladium nanoparticle and bonds to the palladium nanoparticle. The method also includes exposing the palladium nanoparticle to hydrogen to remove the surfactant from the palladium nanoparticle.

DETAILED DESCRIPTION

The present invention provides a simple and efficient method for removing surfactants from palladium nanoparticles. Electrochemical and chemical processes use hydrogen to weaken the adsorption of surfactant on a palladium nanoparticle. The method provides a simple and efficient way to remove surfactants from palladium nanoparticles without using high temperatures.

Surfactants are often used to modify the size and shape of palladium nanoparticles that serve as fuel cell catalysts. Surfactant micelles present during the formation of palladium nanoparticles affect the geometry of the nanoparticles. Particular surfactants and surfactant concentrations can be used to form palladium nanoparticles having the specific sizes and shapes needed to meet fuel cell performance requirements. Suitable surfactants for sizing and shaping palladium nanoparticles include polyvinylpyrrolidone (PVP), and chlorine- and bromine-based salts. The surfactants bind to the palladium nanoparticles as they shape the nanoparticles. These surfactants must be removed from the palladium nanoparticles before they are used as catalysts in order for the nanoparticles to be fully accessible by reactants.

As noted above, surfactants are typically removed by washing the nanoparticles (with or without low temperature heat treatment) or high temperature treatment. Each of these surfactant removal methods has drawbacks. Some surfactants can be removed only after extremely long washing times. Long periods of time spent washing the nanoparticles increases the time and costs required for production of the final nanoparticle catalyst. High temperature treatments typically require temperatures above 300° C. and can have deleterious effects on palladium nanoparticles. As noted above, at 300° C., palladium nanoparticles may lose their shape and increase in size. High temperature treatment to remove surfactants from the nanoparticles can eliminate the size and shape modifications the surfactants were used to provide.

Figure 1:
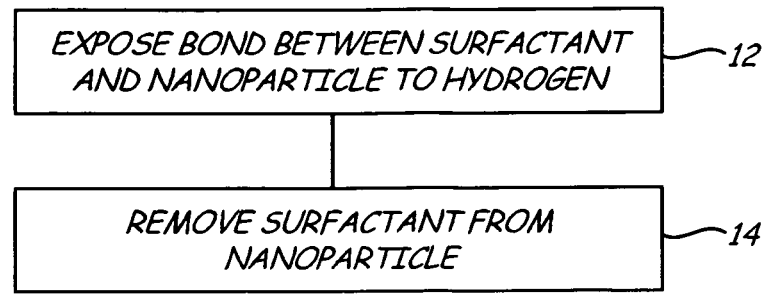
FIG. 1 is a simplified schematic of a method for removing surfactant from a palladium nanoparticle.

Instead of using a lengthy washing method or a harmful high temperature method, the present invention uses molecular hydrogen to weaken bonds between a nanoparticle and the surfactant used to shape and/or size the nanoparticle. FIG. 1 illustrates a simplified schematic of a method for removing surfactant from a nanoparticle. Method 10 includes exposing the nanoparticle to hydrogen (step 12) and removing the surfactant from the nanoparticle (step 14). The hydrogen penetrates into the palladium particles and expands the palladium-palladium lattice distance. This expansion of the palladium-palladium lattice distance weakens adsorption of surfactants and facilitates removal of the surfactants from the nanoparticle. As discussed below, hydrogen exposure step 12 can be performed by electrochemical or chemical methods.

Figure 2:
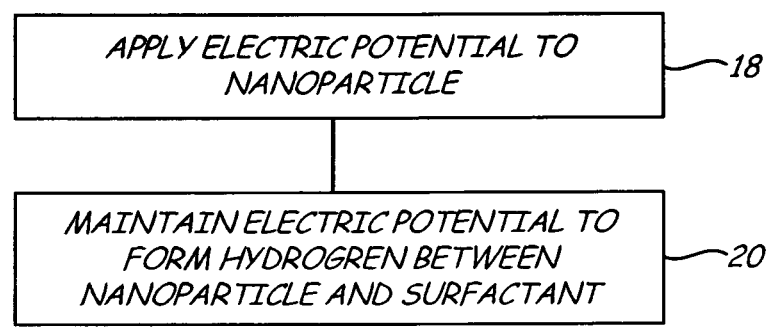
FIG. 2 is a simplified schematic of a method for exposing a bond between a surfactant and a palladium nanoparticle to hydrogen using an electric potential.

FIG. 2 illustrates a simplified schematic of electrochemical method 16 for removing a surfactant from a nanoparticle. In step 18, an electric potential is applied to the nanoparticle. Suitable electric potentials are at or below the potential where hydrogen adsorption/absorption and hydrogen evolution occurs. In exemplary embodiments, the electric potential measures between about −0.2V and about 0.35V against a reversible hydrogen electrode. In even more exemplary embodiments, the electric potential measures between about −0.2V and about 0.1V against a reversible hydrogen electrode. In one particular embodiment, the electric potential measures about −0.05V against a reversible hydrogen electrode.

In step 20, the electric potential is maintained for a time sufficient to allow hydrogen to penetrate into the nanoparticle. The nanoparticle acts as an electrode and hydrogen forms as a result of a multistep reaction. First, adsorbed hydrogen atoms form at the surface of the nanoparticle $$H_3O^+ + e^- \mathring{H}_{ads} + H_2O \quad (1)$$

where $\mathring{H}_{ads}$ is an adsorbed hydrogen atom at the nanoparticle surface. The adsorbed hydrogen atoms combine to form molecular hydrogen $$\mathring{H}_{ads} + \mathring{H}_{ads} \rightarrow H_2 \quad (2)$$

or a further electrochemical reaction produces molecular hydrogen $$\mathring{H}_{ads} + H_3O^+ + e^- \rightarrow H_2 + H_2O \quad (3)$$

depending on the electrode potential. The formed hydrogen penetrates into the palladium nanoparticle forming palladium hydrides and expanding the palladium nanoparticle lattice. Palladium hydride is metallic palladium that contains a substantial quantity of hydrogen within its crystal lattice. At room temperature and atmospheric pressure, palladium can absorb up to 900 times its own volume of hydrogen. The adsorption of surfactants becomes weaker and the surfactants easily desorb from the palladium surface due to the lattice expansion. In some cases, molecular hydrogen is not necessary. Atomic hydrogen formed in reaction (1) can also be absorbed by palladium and cause lattice expansion.

In exemplary embodiments, the electric potential is maintained for less than about five minutes. In one particular embodiment, the electric potential is maintained for no more than about one minute. Steps 18 and 20 are typically performed at room temperature (between about 15° C. and about 30° C.). Electrolytes are used during steps 18 and 20. Suitable electrolytes include dilute aqueous acids such as 0.1 M perchloric acid ($HClO_4$).

Figure 3:
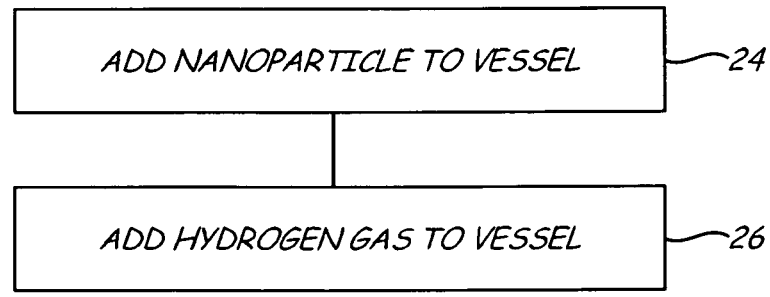
FIG. 3 is a simplified schematic of a method for exposing a bond between a surfactant and a palladium nanoparticle to hydrogen using hydrogen gas.

FIG. 3 illustrates a simplified schematic of chemical method 22 for removing surfactants on a palladium nanoparticle. Instead of forming hydrogen on the surface of the palladium nanoparticle, molecular hydrogen is delivered to the palladium nanoparticle without involving an electrochemical reaction. In step 24, a sized and shaped palladium nanoparticle having surfactant is placed in a vessel. In step 26, hydrogen gas is added to the vessel so that molecular hydrogen is absorbed by the palladium nanoparticle resulting in lattice expansion of the palladium nanoparticle. The absorbed hydrogen weakens the bonds between the palladium nanoparticle and surfactant, allowing the surfactant to be easily removed.

Once a sufficient amount of hydrogen has been absorbed by the palladium nanoparticle, the bonds between the surfactant and the palladium nanoparticle will have weakened enough so that the surfactant merely desorbs from the nanoparticle (i.e. the surfactant "falls off" the nanoparticle). The hydrogen present at the surface of the palladium nanoparticle or within the palladium crystal lattice also requires no further treatment. Any hydrogen present will leave on its own prior to or during use as a fuel cell catalyst.

Figure 4:
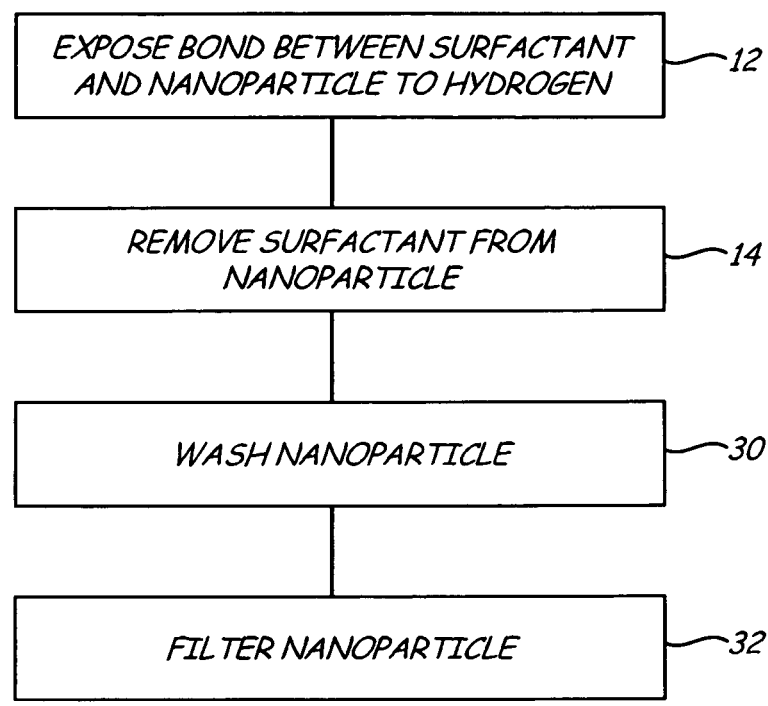
FIG. 4 is a simplified schematic of a method for removing surfactant from a palladium nanoparticle.

FIG. 4 illustrates a simplified schematic of a method for removing surfactant from a nanoparticle having post-processing steps. Method 28 includes the steps of method 10 (exposing the nanoparticle to hydrogen and removing the surfactant from the nanoparticle) as well as washing step 30 and filtering step 32. The palladium nanoparticle is washed with water. Washing step 30 provides for the removal of impurities as well as any solvent used during steps 18 and 20. Palladium nanoparticles treated according to the methods above can also be filtered in step 32 to further purify the nanoparticles.

Figure 5:
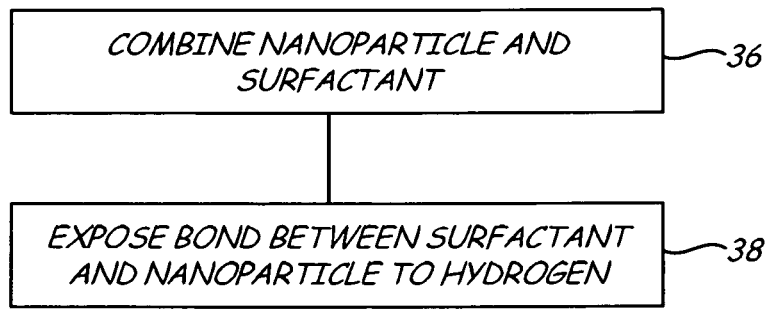
FIG. 5 is a simplified schematic of a method for preparing a palladium nanoparticle.

FIG. 5 illustrates a simplified schematic of a method for preparing a palladium nanoparticle. Method 34 includes combining a palladium nanoparticle with a surfactant (step 36). In step 36, the surfactant modifies a geometric property (e.g., size, shape, etc.) of the nanoparticle. The surfactant bonds to the nanoparticle as a result of the geometric modification of step 36. Once the geometric property of the nanoparticle has been modified, the nanoparticle is exposed to hydrogen in step 38 in order to remove the surfactant from the nanoparticle. Step 38 is performed according to method 16 or method 22 described above. Following step 38, the surfactant is no longer bonded to the nanoparticle and the nanoparticle is ready for use.

To summarize, hydrogen is used to weaken a bond between a palladium nanoparticle and the surfactant used to shape and size the nanoparticle. Hydrogen can be formed at the surface of the palladium nanoparticle using an electrochemical method so that it is absorbed by the nanoparticle. Hydrogen can also be added to the nanoparticle environment so that it is absorbed by the nanoparticle. The exposure of the nanoparticle to hydrogen expands the nanoparticle's lattice structure and weakens the bond between the surfactant and the nanoparticle, allowing the surfactant to be easily removed. The method described herein allows for simple, quick and efficient surfactant removal without using deleterious high temperatures or requiring long processing times.

Although the present invention has been described with reference to preferred embodiments, workers skilled in the art will recognize that changes may be made in form and detail without departing from the spirit and scope of the invention.

The invention claimed is:

1. A method for removing a surfactant from a palladium nanoparticle, the method comprising:
   exposing the palladium nanoparticle to hydrogen, the exposing including:
      applying an electric potential to the palladium nanoparticle, wherein the electric potential applied to the palladium nanoparticle is at or below a potential required for hydrogen adsorption/absorption and hydrogen evolution;
      maintaining the electric potential for a time sufficient for hydrogen to penetrate into the palladium nanoparticle; and
   removing the surfactant from the palladium nanoparticle.

2. The method of claim 1, wherein the palladium nanoparticle comprises a chemical substance selected from the group consisting of palladium, palladium alloys and combinations thereof.

3. The method of claim 2, wherein exposing the palladium nanoparticle to hydrogen comprises:
   placing the palladium nanoparticle in a vessel; and
   adding hydrogen gas to the vessel so that hydrogen is absorbed by the palladium nanoparticle.

4. The method of claim 1, wherein the electric potential applied to the palladium nanoparticle measures from about −0.2V to about 0.1V.

5. The method of claim 4, wherein the electric potential applied to the palladium nanoparticle measures about −0.05V.

6. The method of claim 1, wherein the electric potential is applied to the palladium nanoparticle for less than about five minutes.

7. The method of claim 6, wherein the electric potential is applied to the palladium nanoparticle for no more than about one minute.

8. The method of claim 1, wherein the electric potential is applied to the palladium nanoparticle while the palladium nanoparticle is at a temperature between about 15° C. and about 30° C.

9. The method of claim 1, wherein the electric potential is applied to the palladium nanoparticle in the presence of a dilute acid.

10. The method of claim 1, further comprising:
washing the palladium nanoparticle with water after applying the electric potential to the palladium nanoparticle.

11. The method of claim 1, further comprising:
filtering the palladium nanoparticle after applying the electric potential to the palladium nanoparticle.

12. A method comprising:
synthesizing a palladium nanoparticle using a surfactant, wherein the surfactant influences a geometric property of the palladium nanoparticle and bonds to the palladium nanoparticle; and
exposing the palladium nanoparticle to hydrogen to remove the surfactant from the palladium nanoparticle, the exposing including:
applying an electric potential to the palladium nanoparticle wherein the electric potential applied to the palladium nanoparticle is at or below a potential required for hydrogen adsorption/absorption and hydrogen evolution; and
maintaining the electric potential for a time sufficient for hydrogen to penetrate into the palladium nanoparticle to weaken a bond between the surfactant and the palladium nanoparticle.

13. The method of claim 12, wherein the palladium nanoparticle comprises a chemical substance selected from the group consisting of palladium, palladium alloys and combinations thereof.

14. The method of claim 13, wherein the exposing the palladium nanoparticle to hydrogen comprises:
placing the palladium nanoparticle in a vessel; and
adding hydrogen gas to the vessel so that hydrogen is absorbed by the palladium nanoparticle.

15. The method of claim 12, wherein the electric potential applied to the palladium nanoparticle measures from about −0.2V to about 0.1V.

16. The method of claim 15, wherein the electric potential applied to the palladium nanoparticle measures about −0.05V.

17. The method of claim 12, wherein the electric potential is applied to the palladium nanoparticle for less than about five minutes.

18. The method of claim 17, wherein the electric potential is applied to the palladium nanoparticle for no more than about one minute.

19. A method for removing a surfactant from a palladium nanoparticle, the method comprising:
exposing the palladium nanoparticle to hydrogen at room temperature; and
removing the surfactant from the palladium nanoparticle.

20. A method for removing a surfactant from a palladium nanoparticle, the method comprising:
exposing the palladium nanoparticle to hydrogen at a temperature which remains below 300° C., the exposing including:
applying an electric potential to the palladium nanoparticle wherein the electric potential applied to the palladium nanoparticle is at or below a potential required for hydrogen adsorption/absorption and hydrogen evolution; and
maintaining the electric potential for a time sufficient for hydrogen to penetrate into the palladium nanoparticle to weaken a bond between the surfactant and the palladium nanoparticle; and
removing the surfactant from the palladium nanoparticle.

21. A method comprising:
synthesizing a palladium nanoparticle using a surfactant, wherein the surfactant influences a geometric property of the palladium nanoparticle and bonds to the palladium nanoparticle; and
exposing the palladium nanoparticle to hydrogen at room temperature, the exposing removing the surfactant from the palladium nanoparticle.

22. A method comprising:
synthesizing a palladium nanoparticle using a surfactant, wherein the surfactant influences a geometric property of the palladium nanoparticle and bonds to the palladium nanoparticle; and
exposing the palladium nanoparticle to hydrogen at a temperature which remains below 300° C., the exposing removing the surfactant from the palladium nanoparticle, the exposing including:
applying an electric potential to the palladium nanoparticle wherein the electric potential applied to the palladium nanoparticle is at or below a potential required for hydrogen adsorption/absorption and hydrogen evolution; and
maintaining the electric potential for a time sufficient for hydrogen to penetrate into the palladium nanoparticle to weaken a bond between the surfactant and the palladium nanoparticle.

* * * * *

UNITED STATES PATENT AND TRADEMARK OFFICE
CERTIFICATE OF CORRECTION

PATENT NO. : 9,553,318 B2  
APPLICATION NO. : 14/122546  
DATED : January 24, 2017  
INVENTOR(S) : Minhua Shao Page 1 of 1

It is certified that error appears in the above-identified patent and that said Letters Patent is hereby corrected as shown below:

On the Title Page

Item (56)
"CN 10111337 A 1/2008" should read --CN 101111337 A 1/2008--.

Item (56)
"EP 2 177 257 A1 3/2016" should read --EP 2 177 257 A1 4/2010--.

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*